(12) United States Patent
Mandia

(10) Patent No.: US 11,985,135 B2
(45) Date of Patent: May 14, 2024

(54) STATED AGE FILTER

(71) Applicant: Snap Inc., Santa Monica, CA (US)

(72) Inventor: Patrick Mandia, Venice, CA (US)

(73) Assignee: Snap Inc., Santa Monica, CA (US)

( * ) Notice: Subject to any disclaimer, the term of this patent is extended or adjusted under 35 U.S.C. 154(b) by 330 days.

(21) Appl. No.: 17/212,601

(22) Filed: Mar. 25, 2021

(65) Prior Publication Data

US 2021/0392141 A1 Dec. 16, 2021

Related U.S. Application Data

(60) Provisional application No. 62/705,088, filed on Jun. 10, 2020.

(51) Int. Cl.
*H04L 9/40* (2022.01)

(52) U.S. Cl.
CPC ................. *H04L 63/102* (2013.01)

(58) Field of Classification Search
CPC .................................................. H04L 63/102
See application file for complete search history.

(56) References Cited

U.S. PATENT DOCUMENTS

| | | | | |
|---|---|---|---|---|
| 9,607,341 | B2* | 3/2017 | Hochberg | G06Q 20/14 |
| 10,984,458 | B1* | 4/2021 | Gutierrez | G06V 40/168 |
| 10,990,654 | B1* | 4/2021 | Darak | G06F 21/105 |
| 2006/0149727 | A1* | 7/2006 | Viitaharju | G06F 21/10 |
| | | | | 707/999.005 |
| 2006/0173793 | A1* | 8/2006 | Glass | G06F 16/9535 |
| | | | | 707/E17.116 |
| 2007/0005766 | A1* | 1/2007 | Singhal | H04L 67/63 |
| | | | | 709/225 |
| 2014/0221071 | A1* | 8/2014 | Calio | G07F 17/3225 |
| | | | | 463/31 |
| 2016/0239887 | A1* | 8/2016 | Zhao | G06Q 30/0607 |
| 2017/0091439 | A1* | 3/2017 | Sharma | H04W 12/068 |
| 2019/0073676 | A1* | 3/2019 | Wang | H04W 4/029 |
| 2020/0092285 | A1* | 3/2020 | Graham | G06Q 20/3821 |
| 2020/0211099 | A1* | 7/2020 | Smith | G06Q 20/223 |
| 2020/0242212 | A1* | 7/2020 | Gibb | H04L 63/10 |
| 2020/0260361 | A1* | 8/2020 | Donikian | H04W 12/06 |
| 2020/0312064 | A1* | 10/2020 | Deal | G06Q 30/0607 |
| 2020/0364746 | A1* | 11/2020 | Longano | G06N 20/00 |
| 2021/0011975 | A1* | 1/2021 | Aarabi | G06F 40/30 |
| 2021/0365913 | A1* | 11/2021 | Dunjic | G06Q 20/382 |
| 2021/0374693 | A1* | 12/2021 | La Salle | G06Q 20/4014 |

* cited by examiner

*Primary Examiner* — Jason Chiang
(74) *Attorney, Agent, or Firm* — Schwegman Lundberg & Woessner, P.A.

(57) ABSTRACT

A stated age filter is embedded in a computer-implemented application and is configured to limit users' access to features of the computer-implemented application based on the user's stated age. The stated age filter is constructed in the form of a software development kit (SDK) and may be used in the context of a messaging system that hosts a backend service for an associated messaging client, where the backend service is also the SDK provider system. The stated age filter permits a computer-implemented application to request and obtain, from a prospective user of the application, an authorization to communicate with the messaging system in order to verify whether the user's age, as self-reported to the messaging system, is equal to or greater than the minimum age requirement specified by the computer-implemented application.

16 Claims, 6 Drawing Sheets

STATED AGE FILTER

CLAIM OF PRIORITY

This application claims the benefit of priority to U.S. Provisional Application Ser. No. 62/705,088, filed on Jun. 10, 2020, which is incorporated herein by reference in its entirety.

TECHNICAL FIELD

The present disclosure relates generally to facilitating interactions between a messaging application and third-party resources.

BACKGROUND

The popularity of computer-implemented tools that permit users to access and interact with content and other users online continues to grow. For example, various computer-implemented tools exist that permit users to share content with other users through messaging applications or to play with other users online in multiplayer video games. Some of such computer-implemented tools, termed applications or apps, can be designed to run on a mobile device such as a phone, a tablet, or a watch. Selected functionality of a computer-implemented application may be made available to developers of third party apps by means of one or more software developer kits (SDKs).

For some computer-implemented applications, such as, for example, dating apps, it may be desirable to verify a minimum age of a user before permitting the user to connect to the application. One existing method of age verification entails requesting that users enter their birth date into a field of an electronic form. Another method, which is based on the assumption that U.S. credit card companies only issue cards to adults, entails requesting credit card information of a user before permitting the user to access features of the application.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
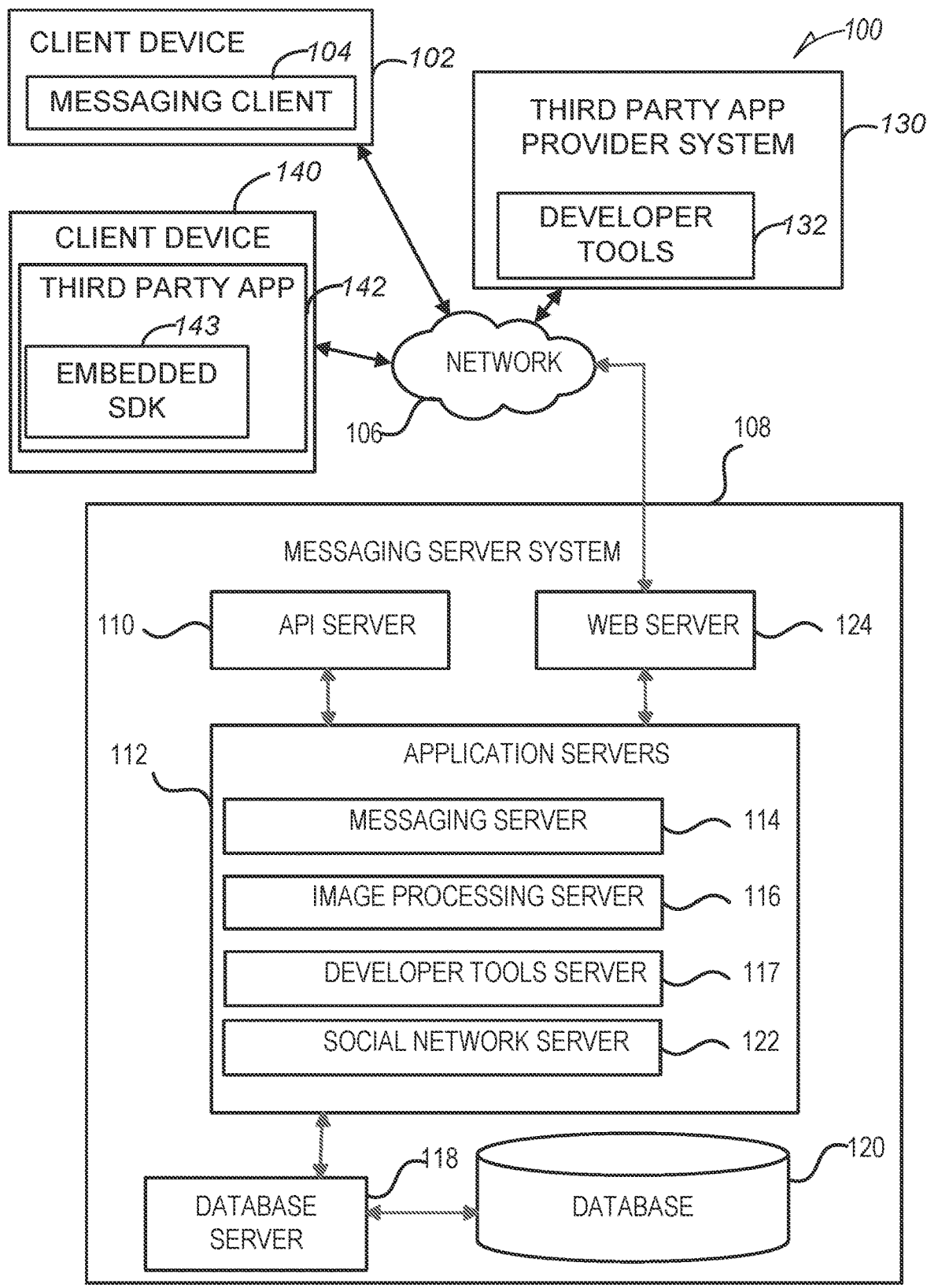
FIG. 1 is a diagrammatic representation of a networked environment in which a stated age filter may be deployed, in accordance with some examples.

Embodiments of the present disclosure improve the functionality of computer-implemented applications by permitting a third party app to filter prospective users that may be too young for certain features of an app such as a dating site, while preserving the users' privacy by avoiding requesting the users to provide potentially sensitive information such as, for example, the date of birth or credit card information. The technical problem of determining age-based eligibility of a user to access an app without requiring that the user provides to the app potentially sensitive personal information is addressed by constructing an SDK that includes a component termed, for the purposes of this description, a stated age filter. The SDK that includes the stated age filter, also referred to as an age filter SDK simply the stated age filter, can be utilized by a third party app when the SDK is embedded in the third party app. The SDK embedded in a third party app may include, in addition to the stated age filter, one or more other features provided by the backend system that supports the SDK, such as, for example, a feature that permits users to connect to the third party app using the credentials of the user with respect to the backend system that supports the SDK.

The stated age filter may be used in the context of a messaging system that hosts a backend service for an associated messaging client, where the backend service for an associated messaging client is also the SDK provider system. The messaging system, comprising a messaging client executing at a client device and supported by a backend service provided at a messaging server system, is configured to permit users to capture images and videos with a camera of a client device that hosts the messaging client and to share the captured content with other users via a network communication. The messaging system can be configured to provide augmented reality (AR) components accessible via the messaging client. AR components can be used to modify content captured by a camera, such as, by overlaying pictures or animation on top of the captured image or video frame, or by adding three-dimensional (3D) effects, objects, characters, and transformations. The messaging system can also include functionality that permits a user to combine several content items, such as images or short videos, into a collection that can be broadcasted as these content items are being captured by using a camera view screen of the messaging client. The messaging system can also permit users to create personalized cartoon avatars of themselves, which can be included into messages to make the online communication more entertaining and expressive.

In order to permit third party developers to use some or all of the features of the messaging system, the messaging system may use a developer tools server that maintains one or more SDKs that can be embedded in a third party app as an embedded SDK. Examples of the one or more SDKs that can be embedded in a third party app as an embedded SDK include an AR kit, a collections kit, a login kit, and a stated age filter. The AR kit is configured to permit users of a third party app to access one or more of the AR components provided by the messaging system and/or to facilitate creation of new AR components by developers of a third party app. The collections kit is configured to permit users of a third party app to access functionality that permits a user to combine several content items, such as images or short videos, into a collection that can be broadcasted as these content items are being captured. The login kit permits a user of the messaging system to connect to a third party app using the credentials of the user with respect to the messaging system.

The stated age filter, which can be used together with the login kit or can even be part of the login kit, permits a third party app to request and obtain, from a prospective user of the app, an authorization to consult the messaging system in order to verify that the user's age, as self-reported to the messaging system, is equal to or greater than the minimum age requirement specified by the third party app. For example, a third party app, that has the minimum age requirement set as 18+ and that has an embedded SDK that includes a stated age filter, can operate to detect an access request from a user and permit access only in response to verifying that the user's stated age, as stored in the messaging system, is indeed greater than 18.

Figure 4:
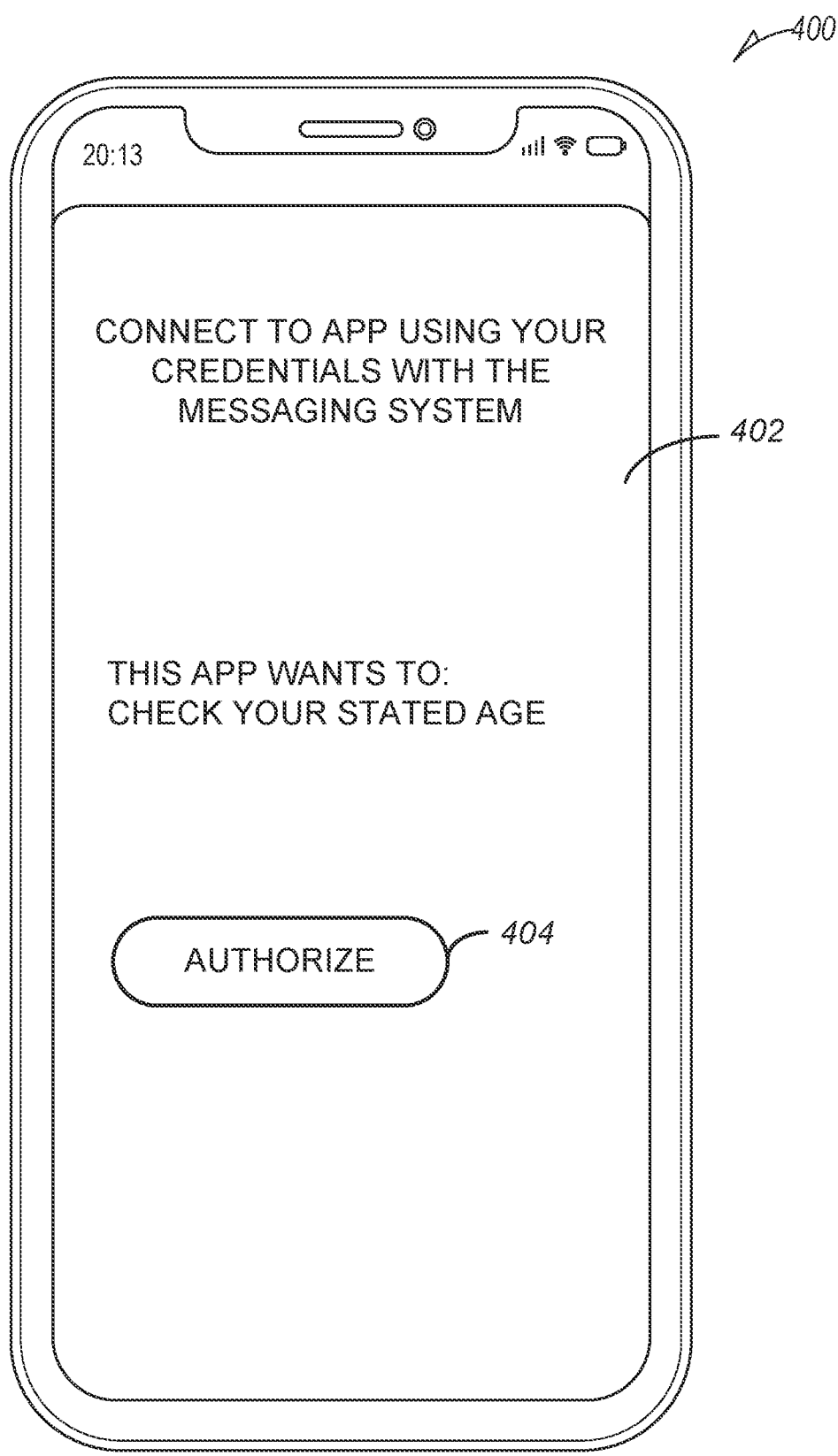
FIG. 4 is a user interface including an authorization request for engaging stated age filter functionality, in accordance with some examples.

The stated age filter may be configured to request an authorization from the user to request that the messaging system accesses the stated age information of the user in the messaging system. Example user interface including an authorization request is shown in FIG. 4, which is described further below. The authorization is requested every time the user attempts to connect to the third party app using the credentials of the user with respect to the messaging system. The messaging system is also configured such that the users can revoke permissions to third party app to access any of their information stored in the messaging system by removing the third party app from the list of connected apps identified in the messaging system. Connected apps, for the purposes of this description, are those apps that permit a user to log in into their system using the user's login credentials with respect to the messaging system.

In some embodiments, the messaging system is configured to discourage users from changing birthdates in their profiles, for example, by limiting the number of times a user can change their birthdate. A warning may be generated and displayed that informs the user of such a limitation. The messaging system may also be configured to disconnect a user who is already connected to the third party app that requires stated age check if the messaging system detects that, subsequent to the user connecting to the third party app using the user's credentials with respect to the messaging system, the user changed their birthdate stored in the messaging system.

Figure 5:
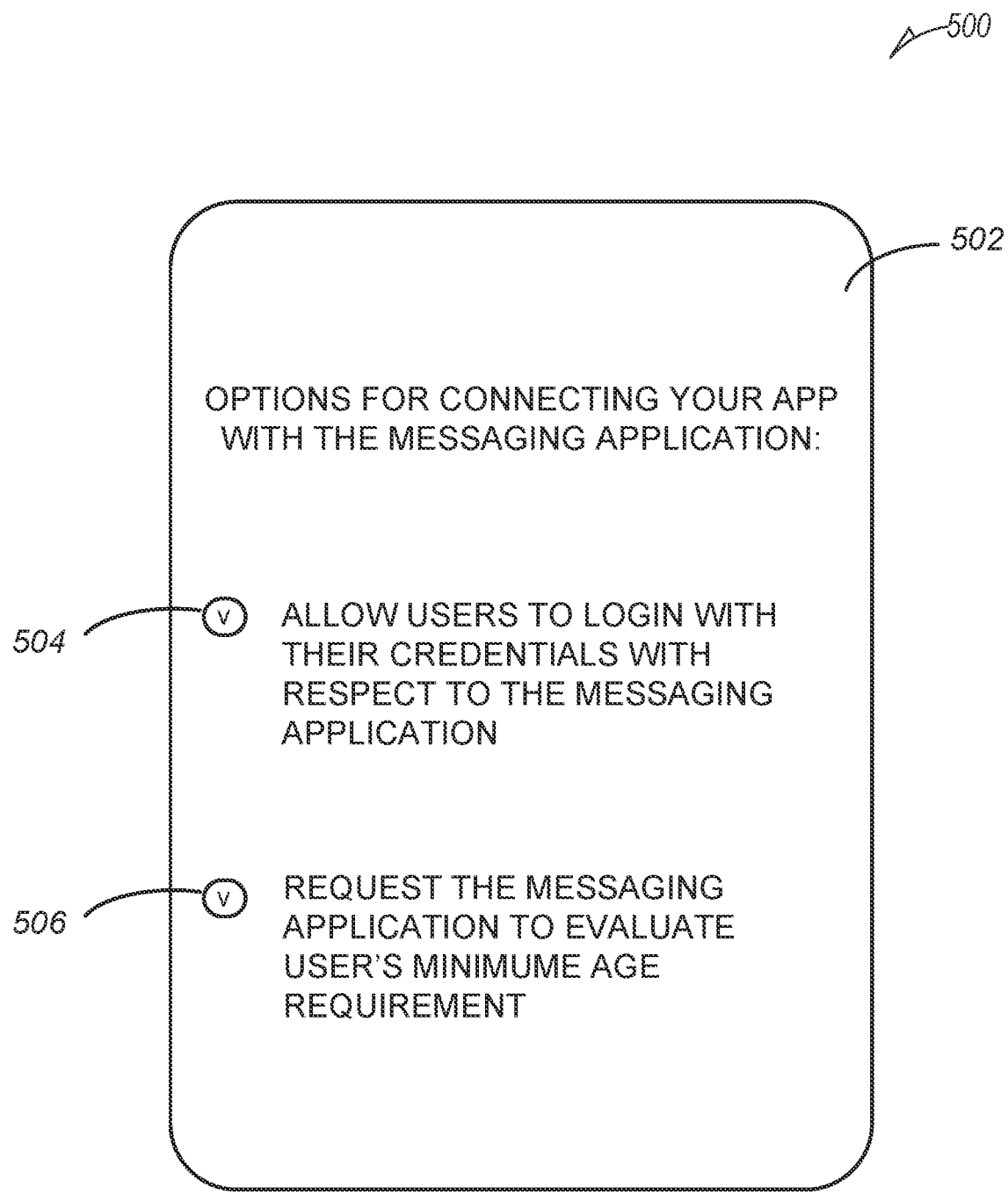
FIG. 5 is a user interface illustrating feature selection provided via a developer portal, in accordance with some examples.

The SDK that includes the stated age filter can be embedded into a third party app by connecting the backend system that supports the SDK (the messaging system, for example) by means of a developer portal. In some examples, the developer portal is configured to permit a developer to select the login kit and the stated age filter to be embedded in their app. A user interface illustrating feature selection provided via the developer portal, in accordance with some examples, is shown in FIG. 5, which is described further below.

The functionality of the stated age filter may be described as follows. When a user requests to connect to a third party app using their credentials stored in the messaging system, the SDK embedded in the third party app (the SDK that includes the stated age filter) obtains an authorization from the user to have the messaging system evaluate the stated age of the user with respect to the minimum age requirement established by the third party app. Provided the user grants the authorization, the method continues; otherwise, the third party app terminates the login process that utilizes the user's credentials with respect to the messaging system. At the backend, the messaging system receives, from the third party app, a request to evaluate stated age information associated with a user profile representing the user stored by the messaging system. The request to evaluate the stated age information may include the minimum age value representing the minimum age requirement established by the third party app. The messaging system determines from the request the minimum age value, compares the stated age information and the minimum age value, and generates a response value based on the result of the comparison. The response value generated at the messaging system contains only an indication of whether the current stated age of the user fulfils the minimum age requirement or not. For example, where the age restriction is 18+, the response value contains only an indication of whether the current stated age of the user is 18+ or not, no historical birthdate information is provided to the third party app by the messaging system.

While the stated age filter is described below in the context of a messaging system, the methodologies described herein can be used advantageously with various computer implemented applications that can provide backend support for SDKs.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120. A web server 124 is coupled to the application servers 112 and provides web-based interfaces to the application servers 112. To this end, the web server 124 processes incoming network requests over the Hypertext Transfer Protocol (HTTP) and several other related protocols. The database 120 stores data associated with messages processed by the application servers 112, such as, e.g., profile data about a particular entity. Where the entity is an individual, the profile data includes, for example, a user name, notification and privacy settings, as well as self-reported age of the user and records related to changes made by the user to their profile data.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, opening an application event (e.g., relating to the messaging client 104), as well as various functions supported by developer tools provided by the messaging server system 108 for use by third party computer systems.

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. The image processing server 116 that is dedicated to performing various image processing operations, typically with respect to images or video within the payload of a message sent from or received at the messaging server 114. The social network server 122 supports various social networking functions and services and makes these functions and services available to the messaging server 114.

Also shown in FIG. 1 is a developer tools server 117. The developer tools server 117 maintains one or more software developer kits (SDKs) that permit users to integrate some of the features provided by the messaging server system 108 across their app (also referred to as a third party app or third party application). Examples of the one or more SDKs that can be embedded in a third party app as an embedded SDK include a login kit which permits a user of the messaging system to connect to a third party app using the credentials of the user with respect to the messaging system, and a stated age filter. A stated age filter, which can be used together with the login kit or can even be part of the login kit, permits a third party app to request and obtain, from a prospective user of the app, an authorization to consult the messaging system in order to verify that the user's age, as self-reported to the messaging system, is equal to or greater than the minimum age requirement specified by the third party app.

The functionality provided by the developer tools server 117 can be accessed from third party computer systems via a developer portal, which may be accessed via a web browser. A developer portal that provides third party computer systems (e.g., the third party application provider system 130) with access to the functionality provided by the developer tools server 117, in some examples, can be downloaded to a third party computer system, in which case it may not require the use of a web browser. The third party application provider system 130 is shown to include a developer portal 132. The third party application 142 is shown to include an embedded SDK 143. The embedded SDK 143 may include a stated age filter and a login kit.

System Architecture

Figure 2:
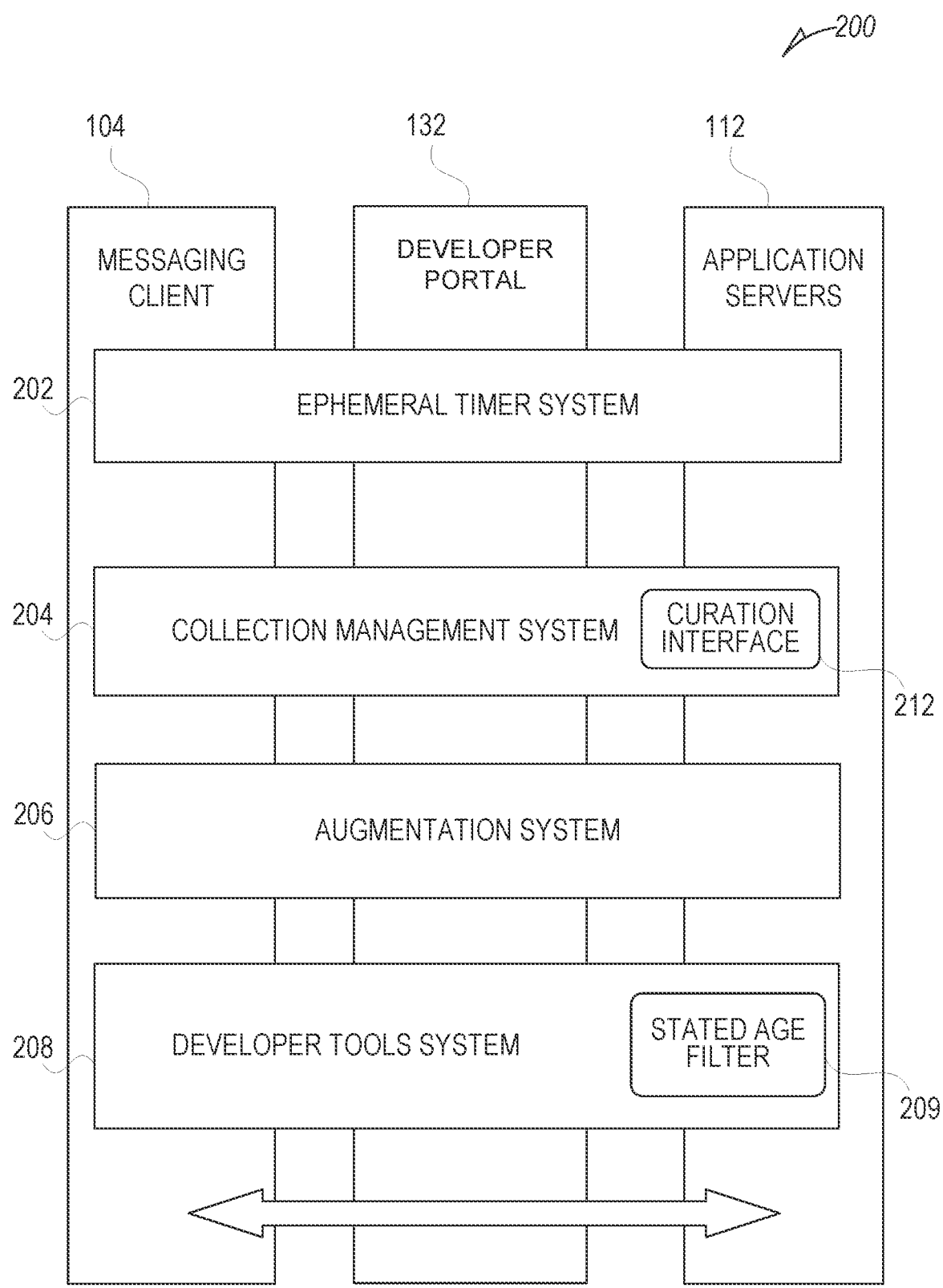
FIG. 2 is a block diagram of an architecture of a development tools system that provides stated age filter functionality, in accordance with some examples

FIG. 2 is a block diagram illustrating further details regarding the messaging system 100, according to some examples. Specifically, the messaging system 100 is shown to comprise the messaging client 104, the developer portal 132, and the application servers 112. The messaging system 100 embodies a number of subsystems, which are supported on the client-side by the messaging client 104 and/or the developer portal 132, and on the server-side by the application servers 112. These subsystems include, for example, an ephemeral timer system 202, a collection management system 204, an augmentation system 206, and a developer tools system 208.

The developer tools system 208 permits users to integrate some of the features provided by the messaging server system 108 into a third party app by embedding an associated SDK into the third party app. An embedded SDK may include a login kit which permits a user of the messaging system to connect to a third party app using the credentials of the user with respect to the messaging system, and a stated age filter that permits a third party app to request and obtain, from a prospective user of the app, an authorization to consult the messaging system in order to verify that the user's age, as self-reported to the messaging system, is equal to or greater than the minimum age requirement specified by the third party app.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118.

In some examples, the augmentation system 206 is configured to provide access to AR components that can be implemented using a programming language suitable for app development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

Method Illustrating Stated Age Filter Functionality

Figure 3:
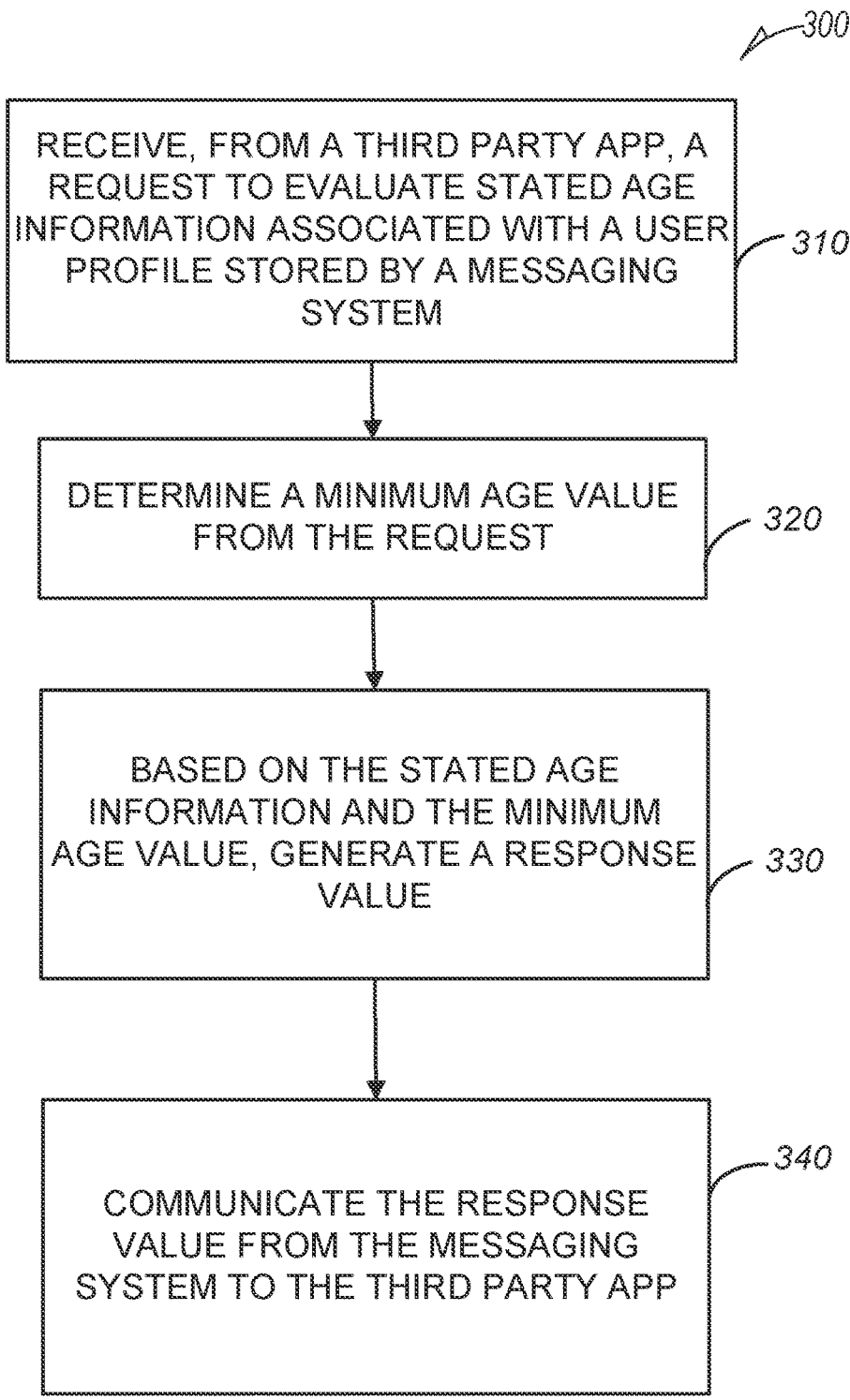
FIG. 3 is a flowchart illustrating utilizing stated age filter functionality, in accordance with some examples, in accordance with some examples.

FIG. 3 is a flowchart illustrating utilizing stated age filter functionality, in accordance with some examples. The method 300 may be performed by processing logic that may comprise hardware (e.g., dedicated logic, programmable logic, microcode, etc.), software, or a combination of both. In one example embodiment, the processing logic resides at the messaging system 100 of FIG. 1.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

The method 300 commences at operation 310 when the messaging system receives, from a third party app executing at a client computer system, a request to evaluate stated age information associated with a user profile stored by the messaging system, wherein the third party app and the messaging system are provided by different entities. At operation 320, the messaging system determines, from the received request, a minimum age value. As described above, for example, the third party app may have the minimum age requirement set as 18+, such that users younger than 18 years old are restricted from connecting to the app or from using at least some of the features provided by the app.

At operation 330, the messaging system compares the stated age information and the minimum age value and generates a response value based on the result of the comparison. At operation 340, the response value is communicated from the messaging system to the third party app. The response value generated at the messaging system contains only an indication of whether the current stated age of the user fulfils the minimum age requirement or not. For example, the response value is TRUE if the stated age information associated with the user profile is greater than or equal to the minimum age value and FALSE if the stated age information associated with the user profile is less than the minimum age value. In the embodiment where the request to evaluate the stated age information is associated with a request to login a user into the third party app using credentials stored in the user profile stored by the messaging system, the request to login the user into the third party app is denied if the response value is FALSE.

The messaging system derives the stated age information from a date of birth information associated with the user profile. As described above, the messaging system may be configured to discourage users from changing birthdates in their profiles, for example, by limiting the number of times a user can change their birthdate. For example, when the messaging system detects a new request from a user to change the date of birth information, the messaging system determines whether the date of birth information has been previously changed and, if so, denies the new request to change the date of birth information. In another example, the messaging system may be configured to cause logging out the user from the third party app (the user having been logged in the third party app using the user's credentials with respect to the messaging system) if the messaging system detects a change to the date of birth information subsequent to the request to login the user into the third party app.

The request from the third party app is associated with an SDK embedded in the third party app—the age filter SDK, which includes a stated age filter. The age filter SDK is configured to obtain the response value that indicates a result of an evaluation of the stated age information associated with the user profile with respect to the minimum age value. The age filter SDK is also configured to surface an authorization request on a display device of the client computer system, detect a positive response to the authorization request, and submit to the messaging system the request to evaluate stated age information associated with the user profile only in response to the detecting of the positive response to the authorization request. As described above, the age filter SDK may be configured to permit a user represented by the user profile in the messaging system to connect to the third party app using credentials of the user with respect to the messaging system and to deny a request to connect the user to the third party app using credentials of the user with respect to the messaging system if the response value indicates that the stated age information associated with the user profile is less than the minimum age value.

User Interfaces

FIG. 4 is a user interface 400 that includes an authorization request for engaging stated age filter functionality, in accordance with some examples. The user interface 400 is presented in response to the user requesting to login into an app with the user's credentials with respect to the messaging system. The user interface 400 displays, in area 402, the information about prospective evaluation of the user's stated age in the messaging system and a user-selectable element 404 actionable to indicate an authorization to evaluate stated age information associated with the user profile in the messaging system.

FIG. 5 is a user interface 500 that illustrates feature selection provided via a developer portal, in accordance with some examples. As explained above, an SDK that includes a stated age filter and/or a login kit can be embedded in a third party app using a developer portal. The user interface 500 displays, in area 502, options for connecting to a third party app using users' credentials with respect to the messaging system. A user of the developer portal can indicate a request to include in their app a feature provided by the developer tools system that would allow users to login into the app with their credentials with respect to the messaging system (user-selectable element 504). A user of the developer portal can also indicate a request to include in their app a feature provided by the developer tools system that would allow the app to request that the messaging system evaluates the user's minimum age requirement established by the app (user-selectable element 506).

Machine Architecture

Figure 6:
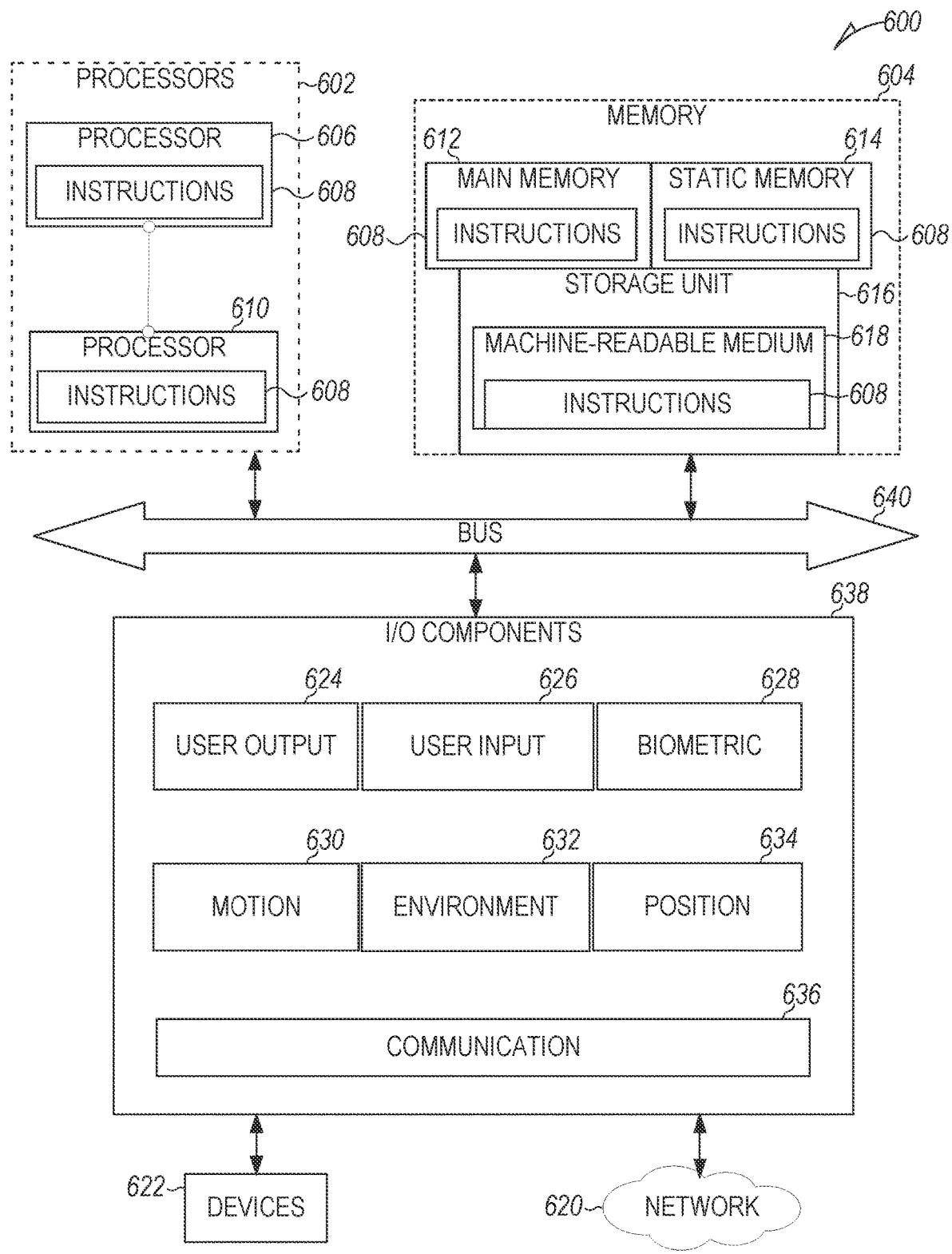
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output I/O components 638, which may be configured to communicate with each other via a bus 640. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 640. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 638 further include communication components 636 operable to couple the machine 600 to a network 620 or devices 622 via respective coupling or connections. For example, the communication components 636 may include a network interface Component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   at a messaging system, receiving, from a third party app executing at a client computer system, a request to evaluate stated age information associated with a user profile stored by the messaging system;
   at the messaging system, determining a minimum age value for the third party app;
   deriving the stated age information from the user profile stored by the messaging system, wherein the request from the third party app does not include the stated age information;
   based on the stated age information associated with the user profile and the minimum age value, generating a response value;
   communicating the response value from the messaging system to the third party app, the messaging system and the third party app provided by different entities;
   detecting a change to a date of birth information associated with the user profile subsequent to the request to login a user into the third party app using credentials stored in the user profile stored by the messaging system;
   subsequent to the detecting of the change to the date of birth, causing logging out of the user from the third party app resulting in inaccessibility of one or more features of the third party app;
   detecting a new request to change the date of birth information;
   determining that the date of birth information has been previously changed; and
   denying the new request to change the date of birth information.

2. The method of claim 1, wherein the response value is TRUE if the stated age information associated with the user profile is greater than or equal to the minimum age value.

3. The method of claim 1, wherein the request to evaluate the stated age information is associated with a request to login the user into the third party app using the credentials stored in the user profile stored by the messaging system.

4. The method of claim 3, wherein the response value is FALSE if the stated age information associated with the user profile is less than the minimum age value, the method comprising denying the request to login the user into the third party app.

5. The method of claim 1, wherein the third party app includes an age filter software development kit (SDK), the age filter SDK configured to obtain the response value, the response value indicating a result of an evaluation of the stated age information associated with the user profile with respect to the minimum age value.

6. The method of claim 5, wherein the age filter SDK is configured to surface an authorization request on a display device of the client computer system, detect a positive response to the authorization request, and submit to the messaging system the request to evaluate stated age information associated with the user profile only in response to the detecting of the positive response to the authorization request.

7. The method of claim 5, wherein the age filter SDK is configured to permit the user represented by the user profile in the messaging system to connect to the third party app using the credentials of the user with respect to the messaging system.

8. The method of claim 7, wherein the age filter SDK is configured to deny a request to connect the user to the third party app using the credentials of the user with respect to the messaging system if the response value indicates that the stated age information associated with the user profile is less than the minimum age value.

9. A system comprising:
one or more processors; and
a non-transitory computer readable storage medium comprising instructions that when executed by the one or more processors cause the one or more processors to perform operations comprising:
at a messaging system, receiving, from a third party app executing at a client computer system, a request to evaluate stated age information associated with a user profile stored by the messaging system;
at the messaging system, determining a minimum age value for the third party app;
deriving the stated age information from the user profile stored by the messaging system, wherein the request from the third party app does not include the stated age information;
based on the stated age information associated with the user profile and the minimum age value, generating a response value;
communicating the response value from the messaging system to the third party app, the messaging system and the third party app provided by different entities;
detecting a change to a date of birth information associated with the user profile subsequent to the request to login a user into the third party app using credentials stored in the user profile stored by the messaging system;
subsequent to the detecting of the change to the date of birth, causing logging out of the user from the third party app resulting in inaccessibility of one or more features of the third party app;
detecting a new request to change the date of birth information;
determining that the date of birth information has been previously changed; and
denying the new request to change the date of birth information.

10. The system of claim 9, wherein the response value is TRUE if the stated age information associated with the user profile is greater than or equal to the minimum age value.

11. The system of claim 9, wherein the request to evaluate the stated age information is associated with a request to login the user into the third party app using the credentials stored in the user profile stored by the messaging system.

12. The system of claim 11, wherein the response value is FALSE if the stated age information associated with the user profile is less than the minimum age value, wherein the operations caused by instructions executed by the one or more processors further include denying the request to login the user into the third party app.

13. The system of claim 9, wherein the third party app includes an age filter software development kit (SDK), the age filter SDK configured to obtain the response value, the response value indicating a result of an evaluation of the stated age information associated with the user profile with respect to the minimum age value.

14. The system of claim 13, wherein the age filter SDK is configured to surface an authorization request on a display device of the client computer system, detect a positive response to the authorization request, and submit to the messaging system the request to evaluate stated age information associated with the user profile only in response to the detecting of the positive response to the authorization request.

15. The system of claim 13, wherein the age filter SDK is configured to permit the user represented by the user profile in the messaging system to connect to the third party app using the credentials of the user with respect to the messaging system.

16. A machine-readable non-transitory storage medium having instruction data executable by a machine to cause the machine to perform operations comprising:
at a messaging system, receiving, from a third party app executing at a client computer system, a request to evaluate stated age information associated with a user profile stored by the messaging system;
at the messaging system, determining a minimum age value for the third party app;
deriving the stated age information from the user profile stored by the messaging system, wherein the request from the third party app does not include the stated age information;
based on the stated age information associated with the user profile and the minimum age value, generating a response value;
communicating the response value from the messaging system to the third party app, the messaging system and the third party app provided by different entities;
detecting a change to a date of birth information associated with the user profile subsequent to the request to login a user into the third party app using credentials stored in the user profile stored by the messaging system;
subsequent to the detecting of the change to the date of birth, causing logging out of the user from the third party app resulting in inaccessibility of one or more features of the third party app;
detecting a new request to change the date of birth information;
determining that the date of birth information has been previously changed; and
denying the new request to change the date of birth information.

* * * * *